United States Patent
Jung et al.

(10) Patent No.: US 9,055,103 B2
(45) Date of Patent: Jun. 9, 2015

(54) METHOD OF CREATING MASHUP APPLICATION

(75) Inventors: Dong-shin Jung, Suwon-si (KR); Joe Antony Lawrence, Tamilnadu (IN); Joo-yeol Lee, Seoul (KR); Raghavendra Malapati, Andhrapradesh (IN); Subramanian Krishnamoorthy, Bangalore (IN); Vinoth Sasidharan, Tamilnadu (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1126 days.

(21) Appl. No.: 12/323,815

(22) Filed: Nov. 26, 2008

(65) Prior Publication Data

US 2009/0193148 A1 Jul. 30, 2009

(30) Foreign Application Priority Data

Jan. 30, 2008 (IN) .............................. 245/CHE/2008
Jun. 12, 2008 (KR) ........................ 10-2008-0055434

(51) Int. Cl.
 *G06F 15/173* (2006.01)
 *G06F 9/44* (2006.01)
 *H04L 29/08* (2006.01)
 *G06F 9/54* (2006.01)

(52) U.S. Cl.
 CPC ................ *H04L 67/16* (2013.01); *G06F 9/548* (2013.01); *H04L 67/02* (2013.01)

(58) Field of Classification Search
 CPC ............ H04L 67/02; H04L 67/16; G06F 9/54
 USPC .......................... 709/224, 227, 246; 717/111
 See application file for complete search history.

(56) References Cited

U.S. PATENT DOCUMENTS

| | | | |
|---|---|---|---|
| 6,192,397 B1* | 2/2001 | Thompson | 709/209 |
| 2005/0125768 A1* | 6/2005 | Wong et al. | 717/100 |
| 2008/0127812 A1* | 6/2008 | Sako et al. | 84/625 |
| 2008/0222599 A1* | 9/2008 | Nathan et al. | 717/107 |
| 2008/0250326 A1* | 10/2008 | Mather | 715/744 |
| 2009/0157728 A1* | 6/2009 | Fletcher et al. | 707/102 |

* cited by examiner

*Primary Examiner* — Brian J Gillis
*Assistant Examiner* — Juan C Turriate Gastulo
(74) *Attorney, Agent, or Firm* — Sughrue Mion, PLLC

(57) ABSTRACT

Provided is a method of creating a mashup application in a host device in communication with a peer device by sharing remote services. The method includes discovering a second device that uses a middleware remote service sharing mechanism within a network, wherein a mashup framework of a first device performs the discovering; analyzing functionalities of the first device and the second device, and determining one of the first device and the second device as a host device and the other of the first device and the second device as the peer device; transmitting a list of available mashup combinations to the host device, wherein the peer device performs the transmitting; and selecting a mashup combination that is to be formed from the list, wherein the host device performs the selecting.

16 Claims, 3 Drawing Sheets

METHOD OF CREATING MASHUP APPLICATION

CROSS-REFERENCE TO RELATED PATENT APPLICATION

This application claims priority from Indian Patent Application No. 245/CHE/2008, filed on Jan. 30, 2008, and Korean Patent Application No. 10-2008-0055434, filed on Jun. 12, 2008, the disclosures of which are incorporated herein in their entirety by reference.

BACKGROUND OF THE INVENTION

1. Field of the Invention

Methods consistent with the present invention relate to mobile communication, and more particularly, to device-to-device dynamic mashups.

2. Description of the Related Art

A mashup is a Web application that combines data from more than one source into a single integrated experience. A mashup platform is a solution for facilitating authoring of mashups in an easier manner. Mashup platforms are loaded together with Web service module used for authoring mashup related to two or more different Web services. There is no conventional method of creating mashups between Web services and device local services and between device-to-device services.

SUMMARY OF THE INVENTION

The present invention provides a method of creating a mashup application in a host device in communication with a peer device on the fly provided that both of the host device and the peer device comprise a mashup framework.

A peer device is identified and analyzed by a mashup framework in a mobile device.

After analyzing functions of a peer device service and the mobile device, the mashup framework suggests combinations of mashup applications that can be created in the peer device. The peer device selects a combination of mashup applications that needs be formed. According to the selected combination of mashup applications, each service shares data by using middleware allowing the peer device and the mobile device to share remote services.

Thereafter, the mashup framework creates a mashup code that can be executed in the peer device. The mashup code is a basic mashup functionality and can be executed provided that the mashup code has an intrinsic functionality of a host device. A peer-to-peer communication and middleware remote service sharing between middleware frameworks of the mobile device and the peer device make it possible to communicate and share data between the mobile device and the peer device.

According to an aspect of the present invention, there is provided a method of creating a mashup application in a host device in communication with a peer device by sharing remote services, the method comprising: discovering a second device that uses a middleware remote service sharing mechanism within a network, wherein a mashup framework of a first device performs the discovering; analyzing functionalities of the first device and the second device, and determining one of them as a host device and another as the peer device; transmitting a list of available mashup combinations to the host device, wherein the peer device performs the transmitting; and selecting a mashup combination that is to be formed from the list, wherein the host device performs the selecting.

A mashup framework of the host device may create an executable mashup code having functionalities of the host device as basic functionalities used for the selected mashup combination.

After executing the mashup code, the mashup framework of the host device may notify a user via a mashup application that is dynamically created.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art.

Exemplary embodiments of the invention are described herein with reference to illustrations that are schematic illustrations of idealized exemplary embodiments (and intermediate structures) of the invention. As such, variations from the form of the illustrations are to be expected. While describing the present invention, detailed descriptions about related well-known functions or configurations that may blur the points of the present invention are omitted.

According to the present invention, each device connected over a network comprises a mashup framework. A mashup framework of a first device uses a middleware remote service sharing mechanism or some general device discovery mechanisms to discover a second device over the network. The first and second devices analyze each other's functionalities and determine one of them as a host device and the other as a peer device. The peer device sends a list of available mashup combinations to the host device. The host device selects a mashup combination that is to be formed from the list. Also, a mashup framework of the host device creates an executable mashup code having functionalities of the host device as basic functionalities used for the selected mashup combination. After executing the mashup code, the mashup framework of the host device notifies a user that a mashup application has been dynamically created.

Figure 1:
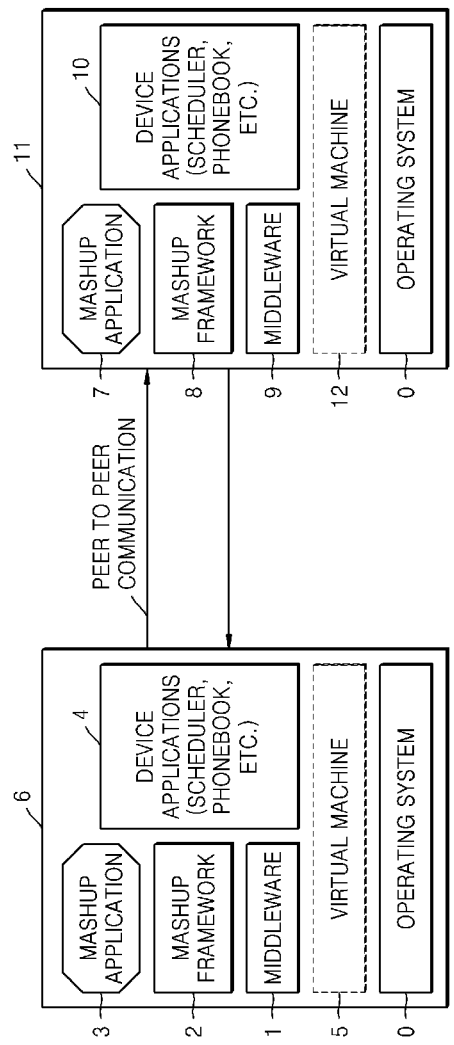
FIG. 1 is a block diagram of mobile and peer devices involved in on the fly creation of a mashup application according to an exemplary embodiment of the present invention.

FIG. 1 is a block diagram of a mobile device 10 and a peer device 20 involved in on the fly creation of a mashup from the mobile device 10 to the peer device 20 with the middleware remote service sharing and elements thereof according to an exemplary embodiment of the present invention. Referring to FIG. 1, the mobile device 6 comprises a mashup framework 2, middleware 1, a virtual machine 5, device applications 4, a mashup application 3 and an operating system 0. The peer device 11 comprises a mashup framework 8, middleware 9, a virtual machine 12, device applications 10, a mashup application 7 and an operating system 0.

In the present exemplary embodiment, when both the mobile device 6 and the peer device 11 are located in the same subnet, both devices use a middleware remote service sharing mechanism or some general device discovery mechanisms to discover each other's mashup framework.

After discovering mashup services from the peer device 11, the mobile device 6 creates a list of combinations of mashup applications with regard to the peer device 11 having the functionality of the peer device 11 as a basic service.

After the mobile device 6 creates the list, the peer device 11 notifies a user of a mashup combination that can be created on the fly from the mobile device 6.

The peer device 11 returns confirmation of a necessary mashup combination to the mashup framework 8.

The middleware 1 of the mobile device 6 and the middleware 9 of the peer device 11 communicate with each other by middleware remote service sharing in order to exchange services. A discovery of different middleware frameworks on the same subnet is managed by middleware remote service sharing.

An executable code used for the selected mashup combination is created by the mashup framework 8 of the peer device 11, and is displayed on the peer device 11 together with information provided by a service of the mobile device 6 and information and services obtained from the peer device 11.

Figure 2:
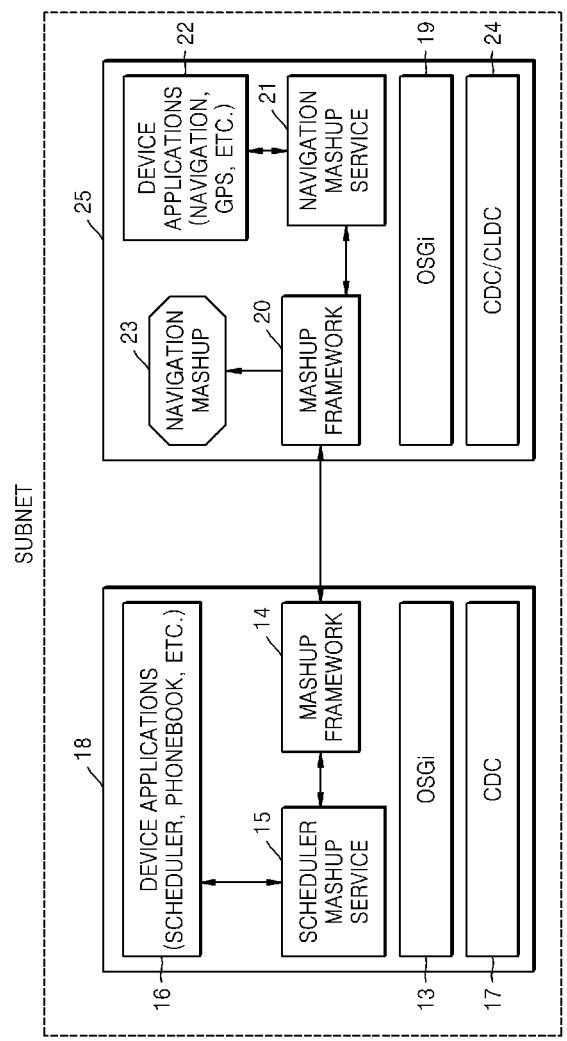
FIG. 2 is a block diagram of a device-to-device dynamic mashup according to an exemplary embodiment of the present invention.

FIG. 2 is a block diagram of a device-to-device dynamic mashup according to an exemplary embodiment of the present invention. Referring to FIG. 2, a mobile device 18 comprises a mashup framework 14, a scheduler mashup sevice 15, device applications 16, an Open Service Gateway initiative (OSGi) 13 and a connected device configuration (CDC) 17. A navigation device 25 comprises a navigation mashup 23, a navigation mashup service 21, device application 22, a mashup framework 20, an OSGi 19 and a CDC/connected limited device configuration (CLDC) 24. The mobile device 18 and the navigation device 25 discover each other when both devices enter into the same subnet and exchange messages. The mashup frameworks 14 and 20 of respective devices 18 and 25 analyze each other's functionalities. According to the analyzed functionalities, the mashup frameworks 14 and 20 determine one of the devices 18 and 25 as a host device and transmit a list of available mashup combinations to the host device. The mashup framework of the host device creates an executable mashup code having the functionalities of the host device as a basic functionalities used for the selected mashup combination. After executing the mashup code, the mashup framework of the host device notifies a user via a mashup application that is to be dynamically created.

Figure 3:
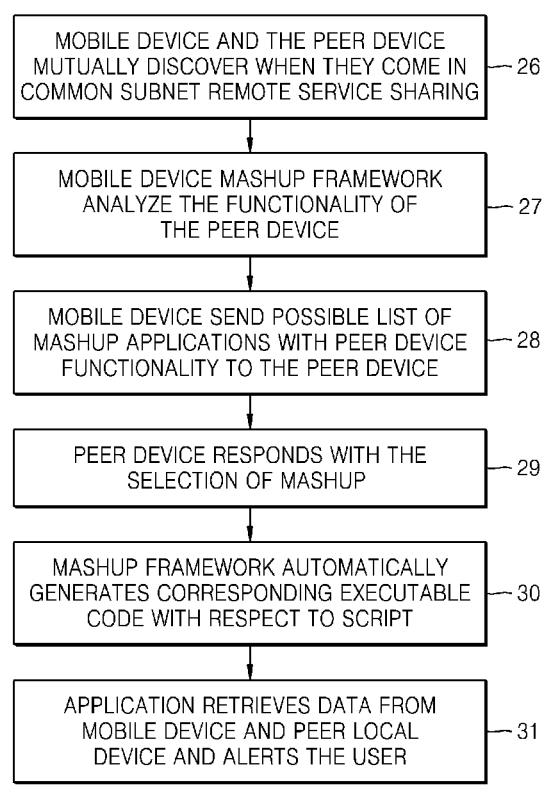
FIG. 3 is a flowchart of a method of creating a mashup application, according to an exemplary embodiment of the present invention.

FIG. 3 is a flowchart of a method of creating a mashup application on the fly from a peer device by dynamically sharing remote services according to an exemplary embodiment of the present invention. Referring to FIG. 3, in operation 26, a mobile device and a peer device identify each other in a subnet. In operation 27, the mobile device analyzes the functionality of the peer device. After analyzing the functionality of the peer device, in operation 28, the mobile device sends a list of available mashup combinations to the peer device. In operation 29, the peer device notifies the mobile device of a selected mashup combination. According to the selected mashup combination, in operation 30, a mashup framework of the peer device creates an executable code in an appropriate script, and in operation 31, displays the executable code on the fly for a user.

According to the exemplary embodiments of the present invention, it is possible to create a device-to-device mashup application from a peer device to a host device.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The invention can also be embodied as computer readable codes transmitted via carrier waves (such as data transmission through the Internet).

Examples of a host that stores applications include a microchip, a microprocessor, a handheld communication device, a rendering device, or a multi-functional device but are not limited thereto.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of creating a mashup application in a first device, the method comprising:
    discovering a second device within a network by using a middleware remote service sharing mechanism, wherein a mashup framework of the first device performs the discovering;
    analyzing functionalities of the first device and the second device, and determining the first device as a host device and the second device as a peer device based on a result of the analyzing;
    receiving, from the second device, a list of available mashup combinations; and
    selecting, in the first device, a mashup combination that is to be formed from the list.

2. The method of claim 1, wherein the mashup framework of the first device creates an executable mashup code having functionalities of the first device as basic functionalities used for the selected mashup combination.

3. The method of claim 2, wherein, after executing the mashup code, the mashup framework of the first device notifies a user via the mashup application that is dynamically created.

4. A non-transitory computer readable recording medium having recorded thereon a program for executing method of creating a mashup application in a first device, the method comprising:
    discovering a second device within a network by using a middleware remote service sharing mechanism, wherein a mashup framework of the first device performs the discovering;

analyzing functionalities of the first device and the second device, and determining the first device as a host device and the second device as a peer device based on a result of the analyzing;

receiving, from the second device, a list of available mashup combinations; and selecting, in the first device, a mashup combination that is to be formed from the list.

5. The non-transitory computer readable recording medium of claim 4, wherein the mashup framework of the first device creates an executable mashup code having functionalities of the first device as basic functionalities used for the selected mashup combination.

6. The non-transitory computer readable recording medium claim 5, wherein, after executing the mashup code, the mashup framework of the first device notifies a user via the mashup application that is dynamically created.

7. A method of creating a mashup application in a first device, the method comprising:

discovering, by using a middleware remote service sharing mechanism, a second device within a network;

receiving a list of available mashup combinations from the second device;

selecting a mashup combination from the list of available mashup combinations;

creating an executable mashup code having functionalities of a host device as basic functionalities used for the selected mashup combination; and executing the mashup code created for the selected mashup combination.

8. The method of claim 7, wherein the discovering of the second device further comprises analyzing functionalities of the first device and the second device, and determining the first device as a host device based on an analysis results.

9. The method of claim 7, wherein, after the executing of the mashup code, the first device notifies a user via a mashup application that is dynamically created.

10. A first device comprising:

a mashup framework that discovers, by using a middleware remote service sharing mechanism, a second device within a network, receives a list of available mashup combinations from the second device, selects a mashup combination from the list of available mashup combinations, creates an executable mashup code having functionalities of a host device as basic functionalities used for the selected mashup combination, and for executes the mashup code created for the selected mashup combination, wherein the mashup framework is implemented as a hardware device.

11. The apparatus of claim 10, wherein the mashup framework further analyzes functionalities of the first device and the second device, and determines the first device as a host device based on an analysis results.

12. The apparatus of claim 10, after the mashup code is executed, the mashup framework notifies a user via a mashup application that is dynamically created.

13. A method of creating a mashup application in a second device, the method comprising:

discovering, by using a middleware remote service sharing mechanism, a first device within a network; and transmitting a list of available mashup combinations to the first device.

14. The method of claim 13, wherein the discovering of the first device further comprises analyzing functionalities of the first device and the second device, and determining the second device as a peer device based on an analysis results.

15. A second device comprising:

a mashup framework that discovers, by using a middleware remote service sharing mechanism, a first device within a network, transmits a list of available mashup combinations to the first device wherein the mashup framework is implemented as a hardware device.

16. The apparatus of claim 15, wherein the mashup framework further analyzes functionalities of the first device and the second device, and determines if the second device is a peer device based on an analysis results.

* * * * *